United States Patent

Andrieu et al.

[11] Patent Number: 5,429,759
[45] Date of Patent: Jul. 4, 1995

[54] PROTON-CONDUCTING POLYMER SOLID ELECTROLYTE

[75] Inventors: Xavier Andrieu, Bretigny sur Orge; Laurence Kerreneur, Marcoussis, both of France

[73] Assignee: Societe Anonyme Dite Alcatel Alsthom Compagnie Generale D'Electricite, Paris, France

[21] Appl. No.: 113,761

[22] Filed: Aug. 31, 1993

[30] Foreign Application Priority Data

Sep. 1, 1992 [FR] France .................. 92 10442

[51] Int. Cl.$^6$ .......................... H01G 9/25; H01M 6/18
[52] U.S. Cl. ........................ 252/62.2; 429/192
[58] Field of Search ............ 252/62.2, 518, 500; 429/192

[56] References Cited

U.S. PATENT DOCUMENTS

| | | | |
|---|---|---|---|
| 3,376,245 | 4/1968 | Sample et al. | |
| 4,357,401 | 11/1982 | Andre et al. | 429/192 |
| 5,162,174 | 11/1992 | Andrei et al. | 429/192 |
| 5,202,009 | 4/1993 | Andrieu et al. | 252/62.2 |

FOREIGN PATENT DOCUMENTS

0424827A1 5/1991 European Pat. Off. .
2593328 7/1987 France .

OTHER PUBLICATIONS

Louai et al, *Polymer*, 1991, vol. 32, No. 4, pp. 703–712 Month not available.
Donoso et al, *Solid State Ionics*, 28–30 (1988), pp. 969–974.
Chiang, C. K. et al, "Synthesis of Ionic Conducting Interpenetrating Polymer Networks", *Polymer Communications*, vol. 28, Feb. 1987, pp. 34–35.
Donso, P. et al, "NMR, Conductivity and Neutron Scattering . . . ", *Solid State Ionics*, vol. 28–30, 1988, pp. 969–974.

*Primary Examiner*—Prince Willis, Jr.
*Assistant Examiner*—Alan D. Diamond
*Attorney, Agent, or Firm*—Sughrue, Mion, Zinn, Macpeak & Seas

[57] ABSTRACT

The present invention provides a proton-conducting polymer solid electrolyte comprising a polyether which has two terminal primary amine functions and which is cross-linked by a curing agent having two epoxy functions, an acid being incorporated into said cross-linked polyether.

12 Claims, No Drawings

PROTON-CONDUCTING POLYMER SOLID ELECTROLYTE

The present invention relates to a proton-conducting polymer solid electrolyte that can be used in numerous applications, e.g. in the electrochemical field or in the micro-ionic field.

Proton-conducting materials include anhydrous inorganic compounds (lanthanum-strontium-aluminum perovskite, or else $KHPO_4$, etc.), or hydrated inorganic compounds (e.g. uranyl phosphate). Anhydrous materials suffer from the drawback of operating only at high temperatures, of about 300° C. At ambient temperature, their conductivity drops considerably. As for hydrated materials, their stability range is limited by that of the solvation water, and, in the absence of humidity, there is no appreciable conductivity. Moreover, such rigid inorganic materials are difficult to implement, and their interfaces with solid electrodes (electrical and ionic contacts) are of poor quality.

The first known proton-conducting polymers were polyelectrolytes, which are polymers on which ions have been grafted, e.g. perfluorosulfonated membranes. In that type of material, the ionic conductivity comes from the liquid phase which swells the polymer. At ambient temperature, conductivity exceeds $10^{-3}$ S/cm for a water content of greater than 30%. But the high cost of such polyelectrolytes and the difficulties encountered in implementing them in making composite electrodes limit their applications.

More recently, proton-conducting polymers have appeared that are constituted by polymers with little or no cross-linking. Such a polymer includes donor heteroatoms, and an acid is dissolved in the polymer. The polymers that are mentioned most often are polyethers or polyethylene imine. The system that is easiest to make from products that are commercially available is an association of polyethylene oxide and phosphoric acid.

At ambient temperature, the ionic conductivity of such anhydrous materials is only about $10^{-5}$ S/cm. In order to increase their conductivity, it is possible to add water to such electrolytes, but their mechanical properties are then considerably degraded. Another major drawback with those polymers is that they are soluble in water, thereby making it difficult to use them, in particular in fuel cells or in electrolytic cells.

An object of the present invention is to make a proton-conducting polymer solid electrolyte that has both high ionic conductivity at ambient temperature, and also good mechanical properties. It must also be insoluble in water and easy to implement.

The present invention provides a proton-conducting polymer solid electrolyte comprising a polyether which has two terminal primary amine functions and which is cross-linked by a curing agent having two epoxy functions, an acid being incorporated into said cross-linked polyether.

Said acid is selected from inorganic acids, such as $H_2SO_4$ or $H_3PO_3$, organic acids, and polyacids that contain —COOH functional groups, such as polyacrylic acid or polymethacrylic acid, organic acids and polyacids that contain —$SO_3H$ functional groups, and mixtures thereof.

The percentage by weight of said acid in the electrolyte lies in the range 5% to 50%. When the quantity of acid is too small, the conductivity is insufficient. Since the solubility of the acid in the polymer is limited, too high an acid content leads to a product that is unstable, or else it becomes very difficult to make the acid soluble.

Said polyether is based on a polymer selected from a polyethylene oxide, a polypropylene oxide, and a statistical copolymer thereof, alternated, block sequenced, or polyether grafted. For example, a polyether of the invention that is derived from a polyethylene oxide has the following general formula:

and, for example, a polyether of the invention that is derived from a polypropylene oxide has the following general formula:

The molecular mass of said polyether lies in the range to 100,000.

In a preferred embodiment, the proportion of said curing agent is selected so that there are 1 to 4 epoxy functions per amine function, thereby giving cross-linking of greater than 50%.

Preferably, the proportion of said curing agent is selected so that there are 2 epoxy functions per amine function, and cross-linking is then close to 100%. Such proportions make it possible to obtain a better compromise between the mechanical properties and the electrochemical properties.

The primary amine functions react with the epoxy functions which open, thereby enabling the resulting secondary amine functions to react in turn with other epoxy functions. This set of reactions ensures that a three-dimensional lattice is formed, and that the polymer is cross-linked.

For example, the succession of reactions may be shown in simplified manner as follows:

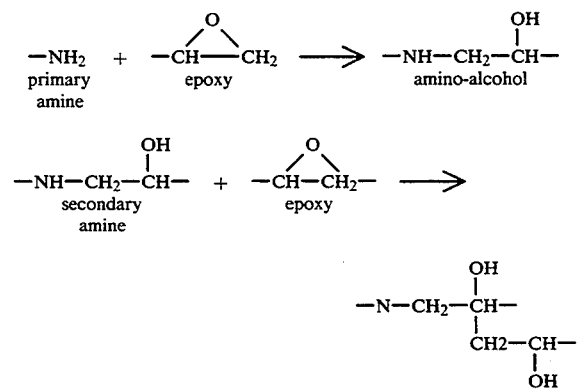

An advantage of cross-linking the polymer is that the electrolyte is given excellent mechanical strength as a result of the three-dimensional lattice that is formed. In particular, the electrolyte obtained is stable in size: it does not creep, and, since it is swollen with the acid, it does not swell when in contact with a solvent while it is being used.

Said curing agent is selected from a compound having low molecular mass and derived from diglycidyl, a polyepoxy resin, and a polyether including two epoxy functions. When the curing agent is a polyether, it may have the same characteristics as the main polymer of the electrolyte.

Preferably, said curing agent is selected from compounds that each include two terminal epoxy functions.

In a first variant, said electrolyte is anhydrous.

In a second variant, said electrolyte includes water in a proportion by weight that is less than 90%, thereby enabling the ionic conductivity of the electrolyte to be increased while maintaining the mechanical properties thereof.

The present invention also provides a method of making a proton-conducting polymer solid electrolyte comprising a polyether which has two terminal primary amine functions and which is cross-linked by a curing agent having two epoxy functions, an acid being incorporated into said polyether, in which method said acid is incorporated into said polyether by immersing said cross-linked polyether in an aqueous solution of said acid.

Preferably, the cross-linking of said polyether by said curing agent is initiated thermally. Said cross-linking takes place in a few minutes at a temperature of about 80° C., optionally in the presence of an electron-accepting catalyst.

The electrolyte obtained in accordance with the present invention also offers the advantages of not being soluble in water, and of being easy to implement. This makes it particularly suitable for use in numerous applications, such as electrochemical cells, fuel cells, electrolytic cells, supercapacitors, electrochemical sensors, electrochromic windows and displays, and in all microionic applications that use solid electrolytes.

Other characteristics and advantages of the present invention appear on reading the following embodiments given by way of non-limiting example.

EXAMPLE 1

The following were dissolved in acetonitrile at 25° C.:

4 grams (g) of 0,0'-bis-(2-aminopropyl)-polyethylene glycol 6000 (Jeffamine ED 6000 sold by Texaco);

0.08 g of butanediol diglycidyl ether as a curing agent; and 0.08 g of $LiClO_4$ as a catalyst.

After complete dissolution, the mixture was cast into a mold, and then the solvent was evaporated in vacuo. The resulting film was cross-linked for 15 hours at 100° C.

The cross-linked film was then swollen with an aqueous phosphoric acid solution, and it was then dried in vacuo to remove the water for 15 hours at 100° C. The resulting anhydrous polymer solid electrolyte contained 30% by weight of phosphoric acid.

The ionic conductivity of the electrolyte as measured between two nickel electrodes by using the complex impedance method was $2 \times 10^{-4}$ S/cm at 25°. This is much higher than the prior art value for non cross-linked anhydrous electrolytes of $10^{-5}$ S/cm (Synthetic Metals, 45 (1991), 323-333).

EXAMPLE 2

Example 1 was reproduced with the phosphoric acid being replaced by sulfuric acid. A polymer solid electrolyte was obtained that contained 20% by weight of sulfuric acid.

The electrolyte had good mechanical strength, and it had conductivity at 25° C. of $1.4 \times 10^{-3}$ S/cm.

EXAMPLE 3

By following the procedure described in example 1, a cross-linked polymer film was made from:

1 g of 0,0'-bis-(2-aminopropyl)-polyethylene glycol 6000;

0.05 g of butanediol diglycidyl ether; and 0.05 g of $LiClO_4$ as a catalyst.

The cross-linked film was then swollen with a 30% aqueous sulfuric acid solution. The percentage by weight of the liquid solution in the polymer solid electrolyte was 80%.

The ionic conductivity as measured under the same conditions as in example 1 but between two gold electrodes was 0.2 S/cm.

EXAMPLE 4

By following the procedure described in example 1, a cross-linked polymer film was made from:

2 g of 0,0'-bis-(2-aminopropyl)-polyethylene glycol 1900 (Jeffamine ED 2001); and 0.4 g of butanediol diglycidyl ether.

The cross-linked film was then dried to remove the solvent for 15 hours at 100° C. under a primary vacuum. An insulating film was obtained having conductivity measured at 25° C. of less than $10^{-9}$ S/cm.

By following the same procedure, a cross-linked polymer film was made from:

2 g of 0,0'-bis-(2-aminopropyl)-polyethylene glycol 1900 (Jeffamine ED 2001);

0.4 g of butanediol diglycidyl ether; and 0.2 g of paratoluene-sulfonic acid.

The cross-linked film was then dried for 15 hours at 100° C. under a primary vacuum. The conductivity measured at 25° C. was $5 \times 10^{-6}$ S/cm.

Naturally, the present invention is not limited to the embodiments described. Numerous variants on the invention that are accessible to a person skilled in the art are possible without going beyond the spirit of the invention.

We claim:

1. A proton-conducting polymer solid electrolyte comprising a polyether which has two terminal primary amine functions and which is cross-linked by a curing agent having two epoxy functions, said electrolyte being characterized by the fact that an acid is dissolved into said cross-linked polyether and that said electrolyte contains water.

2. An electrolyte according to claim 1, characterized by the fact that the percentage by weight of said acid in the electrolyte lies in the range 5% to 50%.

3. An electrolyte according to claim 1 or 2, characterized by the fact that said acid is selected from the group consisting of (A) inorganic acids, (B) organic acids and polyacids that contain —COOH functional groups, (C) organic acids and polyacids that contain —$SO_3H$ functional groups, and (D) mixtures thereof.

4. An electrolyte according to claim 1, characterized by the fact that said polyether is based on a polymer selected from the group consisting of a polyethylene oxide, a polypropylene oxide, and a statistical copolymer thereof which is alternated, block sequenced, or polyether grafted.

5. An electrolyte according to claim 4, characterized by the fact that the molecular mass of said polyether lies in the range 300 to 100,000.

6. An electrolyte according to claim 1, characterized by the fact that the proportion of said curing agent is selected so that there are 1 to 4 epoxy functions per amine function.

7. An electrolyte according to claim 6, characterized by the fact that the proportion of said curing agent is selected so that there are 2 epoxy functions per amine function.

8. An electrolyte according to claim 1, characterized by the fact that said curing agent is selected from the group consisting of a diglycidyl compound, a polyepoxy resin, and a polyether including two epoxy functions.

9. An electrolyte according to claim 1, characterized by the fact that said curing agent is selected from compounds that each include two terminal epoxy functions.

10. An electrolyte according to claim 1, characterized by the fact that said electrolyte includes water in a proportion that is less than 90% of the total mass of the electrolyte.

11. A method of making an electrolyte according to claim 1, characterized by the fact that said acid is dissolved into said cross-linked polyether by immersing said cross-linked polyether in an aqueous solution of said acid.

12. A method of making an electrolyte according to claim 11, said method being characterized by the fact that the cross-linking of said polyether by said curing agent is initiated thermally.

* * * * *